United States Patent
Smith

(10) Patent No.: US 10,521,204 B2
(45) Date of Patent: Dec. 31, 2019

(54) EXISTENTIAL TYPE PACKING FOR STRUCTURALLY-RESTRICTED EXISTENTIAL TYPES

(71) Applicant: Oracle International Corporation, Redwood City, CA (US)

(72) Inventor: Daniel L. Smith, Spanish Fork, UT (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 15/162,550

(22) Filed: May 23, 2016

(65) Prior Publication Data

US 2017/0123771 A1 May 4, 2017

Related U.S. Application Data

(60) Provisional application No. 62/250,833, filed on Nov. 4, 2015.

(51) Int. Cl.
*G06F 8/41* (2018.01)

(52) U.S. Cl.
CPC .................................... *G06F 8/437* (2013.01)

(58) Field of Classification Search
CPC ...................................................... G06F 8/437
See application file for complete search history.

(56) References Cited

U.S. PATENT DOCUMENTS

| | | | |
|---|---|---|---|
| 6,948,156 B2 | 9/2005 | Sokolov | |
| 8,327,327 B2 | 12/2012 | Bierhoff et al. | |
| 2002/0199169 A1 | 12/2002 | Sokolov et al. | |
| 2003/0061230 A1* | 3/2003 | Li | G06F 8/437 |
| 2006/0212847 A1 | 9/2006 | Tarditi, Jr. et al. | |
| 2007/0256060 A1* | 11/2007 | Ryu | G06F 8/437 717/140 |
| 2008/0235675 A1 | 9/2008 | Chen | |
| 2014/0068574 A1* | 3/2014 | Naden | G06F 8/31 717/140 |

OTHER PUBLICATIONS

Nicholas Cameron, "Existential Types for Variance—Java Wildcards and Ownership Types", Doctoral Dissertation, Department of Computing, 2009, pp. 1-252.
Ross Tate, "Mixed-Site Variance", Retrieved from URL: http://www.cs.cornell.edu/~ross/publications/mixedsite/, 2013, pp. 1-12.

* cited by examiner

*Primary Examiner* — Wei Y Zhen
*Assistant Examiner* — Amir Soltanzadeh
(74) *Attorney, Agent, or Firm* — Robert C. Kowert; Kowert, Hood, Munyon, Rankin & Goetzel, P.C.

(57) ABSTRACT

A compiler may perform type checking as part of analyzing source code. The type checking may include existential type packing for structurally-restricted existential types. At compile time, the compiler may need to use an existential type that does not conform to the language's structural rules. The compiler may apply the "pack" operation described herein to produce a supertype of the desired existential type that does conform to the language's structural rules, and thus can be used as an approximation of the desired type. The compiler may then perform additional type checking using the resulting type.

20 Claims, 7 Drawing Sheets

EXISTENTIAL TYPE PACKING FOR STRUCTURALLY-RESTRICTED EXISTENTIAL TYPES

This application claims benefit of priority of U.S. Provisional Application Ser. No. 62/250,833 titled "Existential Type Packing for Structurally-Restricted Existential Types," filed Nov. 4, 2015, the content of which is incorporated by reference herein in its entirety.

BACKGROUND

Field of the Disclosure

This disclosure relates generally to type checking mechanisms for use in software programming, and more particularly to systems and methods for implementing Existential Type Packing for Structurally-Restricted Existential Types.

Description of the Related Art

Many programming languages have a static type system. When working within a static type system, a compiler may typically analyze the types of different variables and expressions in order to determine whether types, variables, expressions and/or statements are used in a legal manner (e.g., according to a specification for the particular programming language being used) and that error messages are generated describing improper use (e.g., according to the specification) of types, variables, expressions and/or statements.

When considering the logical space within which the types of a programming language exist, various logical constructs may be used to describe what is known (e.g., determined by the compiler) about the values appearing at any particular place within the program source code. For instance, a simple type system might use only primitive types and therefore when an int is used, the compiler may determine that there will be 32 bits (e.g., for a system that uses 32 bit integers) in a certain place and that those 32 bites represent a number.

For example, in the Java™ programming language, values are frequently pointers to objects and the types are things that a compiler can positively determine about those objects (such as what kind of class they belong to). Additionally, the Java programming language may utilize generics which may allow a compiler to determine particular things about various types. For example, the use of "String" in "List<String>", may allow the compiler to determine more than simply that there is a List, but also what kind of things are in the List (e.g., the compiler may be able to determine that it is a list of strings). A programming language may use an _existential type_ to represent a part of a type that cannot be positively determined—"∃ X.List<X>".

SUMMARY

In programming language type theory, an existential type may be considered a construct describing partial information about a set of values. Formally, existential types and their use may typically be described with quantifiers. For instance, one example description might involve the statement, "there exists some X such that this variable has the type Foo<X>." The unknown part of the type may be represented by an existentially-quantified type variable, while an existential type may take the form, "exists X, T", where T represents a type in which the type variable X is free (e.g., where it may represent any type). Existential Type Packing for Structurally-Restricted Existential Types as described herein may include defining and/or providing mappings from a type containing one or more free type variables to a "packed" existential type without the free type variables. To map from T to the existential type, the existential quantifier may be added. Adding the existential qualifier may be referred to as "packing" the type, while removing the quantifier may be referred to as "unpacking" the type.

In some embodiments, the "pack" operation may map an input type (e.g., "C<List<X>>") to an output type, where the output may be considered to approximate the desired existential type (e.g., "exists x, C<List<x>>"), and to conform to the language's structural rules. The "pack" operation may be defined in terms of two functions applied to types, termed here "upward projection" and "downward projection". The upward projection may be used to determine the nearest supertype of a type that does not mention any of a given set of type variables. Similarly, the downward projection may be used to determine the nearest subtype of a type that does not mention any of a given set of type variables, if any such subtype exists.

A compiler may perform type checking on source code as part of analyzing the source code for compilation. Type checking the source code may involve, according to some embodiments, Existential Type Packing for Structurally-Restricted Existential Types, as described herein. At compile time, the compiler may need to use an existential type that does not conform to the language's structural rules. To provide meaningful type checking, the compiler may apply the "pack" operation described herein to produce a supertype of the desired existential type that does conform to the language's structural rules, and thus can be used as an approximation of the desired type. The compiler may then perform additional type checking using the resulting type. The resulting type checking may be more precise, more accurate, more complete, provide better error reporting (e.g., fewer false error reports), etc., than could result without using the specified "pack" operation.

DETAILED DESCRIPTION OF EMBODIMENTS

Described herein are various embodiments of enhancements to software development to support various features, such as Existential Type Packing for Structurally-Restricted Existential Types. A compiler may perform type checking as part of analyzing source code. The type checking may include existential type packing for structurally-restricted existential types. A compiler may perform type checking on source code as part of analyzing the source code for compilation. Type checking the source code may involve, according to some embodiments, Existential Type Packing for Structurally-Restricted Existential Types, as described herein. At compile time, the compiler may need to use an existential type that does not conform to the language's structural rules. To provide meaningful type checking, the compiler may apply the "pack" operation described herein to produce a supertype of the desired existential type that does conform to the language's structural rules, and thus can be used as an approximation of the desired type. The compiler may then perform additional type checking using the resulting type. The resulting type checking may be more precise, more accurate, more complete, provide better error reporting (e.g., fewer false error reports), etc., than could result without using the specified "pack" operation.

The methods and/or features described herein may involve various aspects of language development, such as (for example) including base support for describing dynamically derived classes in a Java Virtual Machine (JVM), translation mechanisms in the Java compiler for translating language-level concepts into bytecode that the JVM can execute, and features exposed in the Java language for expressing things that could not previously be expressed, according to various embodiments.

Figure 1:
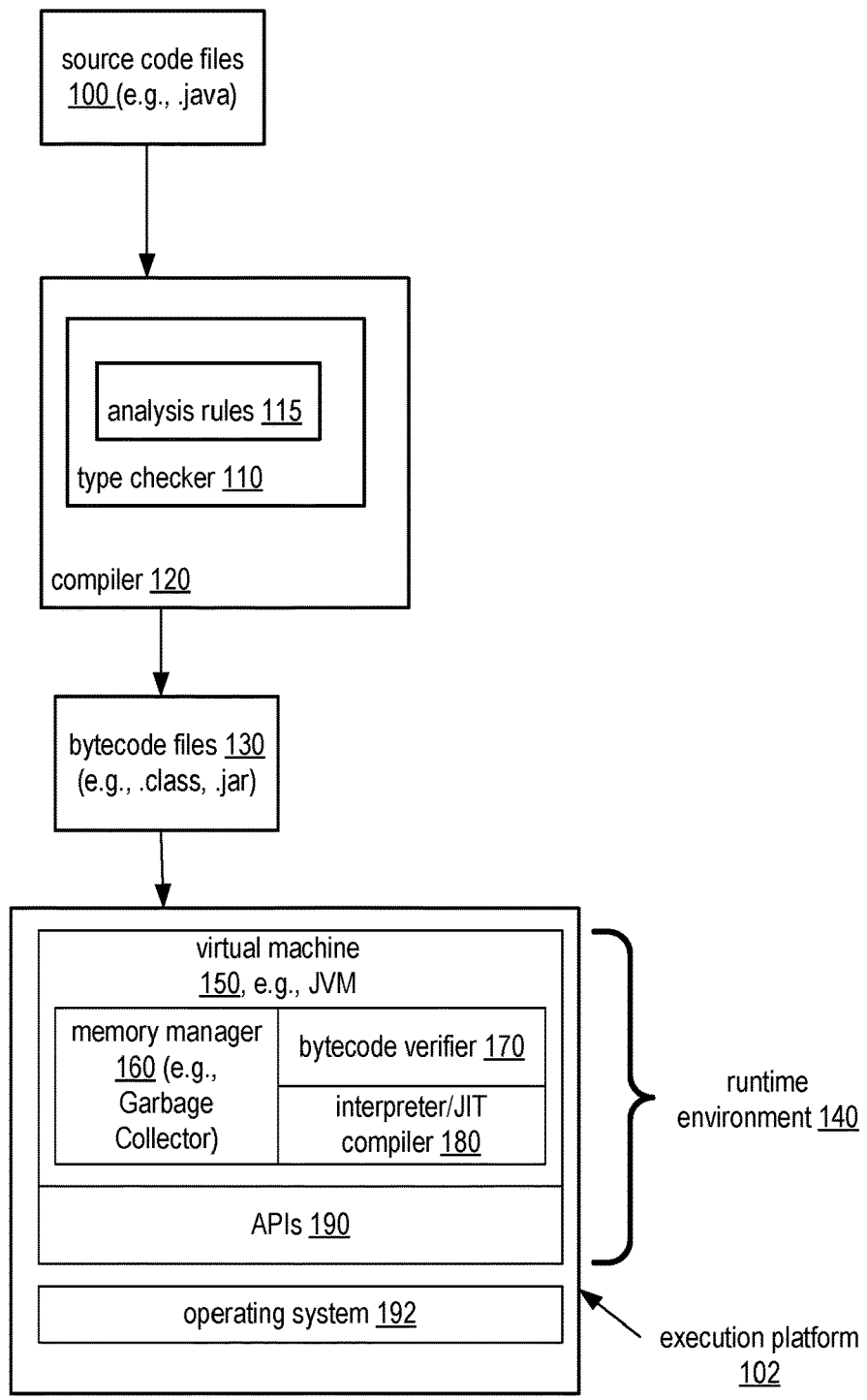
FIG. 1 is a logical block diagram illustrating a workflow for compiling and executing a computer program specified in a high-level object-oriented language, according to various embodiments.

FIG. 1 illustrates a workflow for compiling and executing a computer program specified in a high-level object-oriented language that supports primitive and reference data types, and various methods, features and enhancements regarding Existential Type Packing for Structurally-Restricted Existential Types, as described herein, according to various embodiments. For purposes of illustration, the following description is provided largely in the context of using the Java programming language; however, it is noted that the techniques described may be used for virtually any programming language that supports type checking and/or existential types in any appropriate context.

According to the illustrated embodiment, the workflow begins when a compiler, such as compiler 120, receives source code for a computer program, such as files 100. In various embodiments, source code 100 may be specified in various high-level and/or object-oriented programming languages, such as Java and/or other languages. Source code may be provided as a set of .java files in embodiments where Java is being used. In some embodiments, source code 100 may be specified using a combination of languages, which may include one or more low-level and/or intermediate languages (e.g., assembly). In some embodiments, at least some of the source code may initially be written in a dynamically-typed high-level language, such as Python or Ruby, while in other embodiments, all of the source code may be in a statically-typed language such as Java.

The compiler 120 may analyze the source code 100 to produce an executable version of the program, such as bytecode files 130 (e.g., .class files or .jar files in the case of Java) in the depicted embodiment. For example, compiler 120 may perform type checking on some or all of source code 100 as part of analyzing source code 100. In some embodiments, compiler 120 may utilize a type checker, such as type checker 110, to perform type checking. Type checking source code 100 may involve, according to some embodiments, Existential Type Packing for Structurally-Restricted Existential Types, as described herein. Thus, compiler 120 and/or type checker 110 may perform one or more of the various concepts, mechanisms and/or techniques described herein regarding Existential Type Packing for Structurally-Restricted Existential Types, according to various embodiments. While illustrated in FIG. 1 as a part of compiler 120, in some embodiments, type checker 110 may be separate, and/or distinct, from compiler 120.

Compiler 120 (and/or type checker 110) may perform type checking on source code as part of analyzing the source code for compilation. Type checking the source code may involve, according to some embodiments, Existential Type Packing for Structurally-Restricted Existential Types. At compile time, compiler 120 may need to use an existential type that does not conform to the language's structural rules. To provide meaningful type checking, the compiler may apply the "pack" operation described herein to produce a supertype of the desired existential type that does conform to the language's structural rules, and thus can be used as an approximation of the desired type. The compiler may then perform additional type checking using the resulting type.

Different types of executable code formats may be used in various embodiments. For example, binary machine language may be used instead of bytecodes. In some scenarios, parts of the executable code 130 may be in bytecode while others are in a native binary machine language. As part of compiling program source code 100 into executable code 130, the compiler 120 may perform a sequence of analysis operations and generate various intermediate data structures before generating the executable version. In general, the exact type and/or format of the executable code may vary from embodiment to embodiment.

As illustrated in FIG. 1, executable code 130 may be passed to an execution environment, such as run-time environment 140, which may be configured to execute the code on an execution platform 102, thereby creating various output data and/or behavior. In various embodiments, the run-time environment 140 may include a virtual machine 150 (e.g., a Java Virtual Machine or JVM). The virtual machine 150 may in turn comprise a number of different components, such as a memory manager 160 (which may include a garbage collector), a bytecode verifier 170 to check the validity of the executable code, an interpreter and/or a just-in-time (JIT) compiler 180 such as the HotSpot compiler. The JIT compiler may in some embodiments be responsible for translating some or all of the bytecode (for example, heavily-used portions of bytecode) into platform-specific machine code to improve performance of the program execution. A run-time environment 140, such as the Java Runtime Environment or JRE, may also include code to implement a number of application programming interface (API) libraries 190 in some embodiments. The run-time environment 140 may run on top of lower-level software such as an operating system 192 in some embodiments. In embodiments where virtualized compute resources are being used as the execution platform, virtualization software such as a hypervisor may be used to configure the execution platform 102 for the operating system 192 (i.e., the operating system may run as an application on top of the hypervisor).

In different embodiments, the output or behavior produced as a result of the execution of the compiled code may include data stored in various levels of system memory (e.g., in-memory objects and/or data structures), on persistent storage (e.g., files on a file system), etc. The behavior may also include various program functionalities, such as displaying output on a screen, sending messages over a network, and/or otherwise interacting with various users and/or components.

Various embodiments of the methods, techniques, features and/or enhancements described herein are discussed in terms of the Java programming language and/or using features of software development using the Java programming language. However, the methods, techniques, features and other enhancements described herein may also be used with other programming languages, such as C, C++, C#, Scala®, Python and others, according to various embodiments. For example, when implementing generics within the Java programming language, the question mark symbol (i.e., "?"), called a wildcard, is used to represent an existential type. However, the same concepts, mechanisms and/or techniques described herein regarding Java wildcards may also be used within other programming languages using different representations of existential types.

While the embodiments described herein in the detailed description and examples reflect distinct groups of features, these groupings of features are abstractions for the purpose of clarifying some features by elision from view of others that would be practiced in conjunction, and one of skill in the art will readily ascertain in light of having read the present specification that combinations of features different from the particular combinations described herein are contemplated within the scope and intent of this disclosure. Thus, features from different parts of this disclosure and its appendices may be combined without departing from the scope and intent of this disclosure, and one of skill in the art will readily comprehend in light of this disclosure that different elements of the disclosure and its appendices may be combined in ways not clarified herein to preserve the clarity of discussion of the features themselves.

As noted above, in programming language type theory, an existential type may be considered a construct describing partial information about a set of values. Formally, existential types and their use may typically be described with quantifiers. For instance, one example description might involve the statement, "there exists some X such that this variable has the type Foo<X>." The unknown part of the type may be represented by an existentially-quantified type variable and an existential type may take the form, "exists X, T", where T represents a type in which the type variable X is free (e.g., may represent any type). To map from T to the existential type, the existential quantifier may be added. Adding the existential quantifier may be referred to as "packing" the type, while removing the quantifier may be referred to as "unpacking" the type.

In some embodiments, an existential type variable may have bounds. For example, in additional to describing an existential type in terms of Foo<X> where the type of X is unknown, an existential type may also be described in terms of Foo<X> where X represents a type that is a subtype of some particular interface.

Various programming languages may make use of existential types. For example, in the Java programming language, existential types may be expressed using wildcards, denoted with the '?' character, such as in the type: "C<?>", interpreted as "exists X, C<X>" according to some embodiments. Thus, existential types may also be referred to as wildcard-parameterized types. Like existential type variables, wildcards may have bounds. In the Java programming language, the encoding of existential types with wildcards may limit the structure of existential types. That is, an existential type may be required to always have the form: "exists X, C<A1, . . . , X, . . . , An>", where X appears exactly once as a type argument of the generic class C (and nowhere else). This may be abbreviated as: "C<A1, . . . , ?, . . . , An>".

While described mainly in terms of the Java programming language and specifically in terms of using a question mark (e.g., "?") as a wildcard symbol, in other programming languages, other symbols and/or syntax may be used to indicate an existential type, according to various embodiments.

As a result of a structural restriction on the form of types in some embodiments, such as in Java, there may be logical existential types that are not expressible in the programming language's type system.

The features, techniques, mechanisms and/or methods described herein may be applicable to programming languages that i) are statically typed, ii) have existential types (often in the form of "use-site variance"), and iii) apply structural restrictions to existential types, as in, for example, Java's wildcards. For instance, this combination of features may occur in derivatives or variants of various languages, such as Java, C#, etc., and thus the features, techniques, mechanisms and/or methods described herein may be applicable to such languages.

The form, syntax and/or structure used with existential types may be more or less restricted, according to various embodiments. For example, within the Java programming language existential types may have a restricted form. In other languages, the form, syntax and/or structure used with existential types may be more or less restricted while still utilizing the features, techniques, mechanisms and/or methods described herein.

As noted above, one method for Existential Type Packing for Structurally-Restricted Existential Types may include converting an input type that mentions free type variables into a packed existential type that does not mention the free type variables. A compiler may convert the input type during type checking. In some embodiments, converting the input type may include applying, to the input type, at least one rule from a set of rules defining potential conversions and corresponding criteria for determining which potential conversion should be applied.

Figure 2:
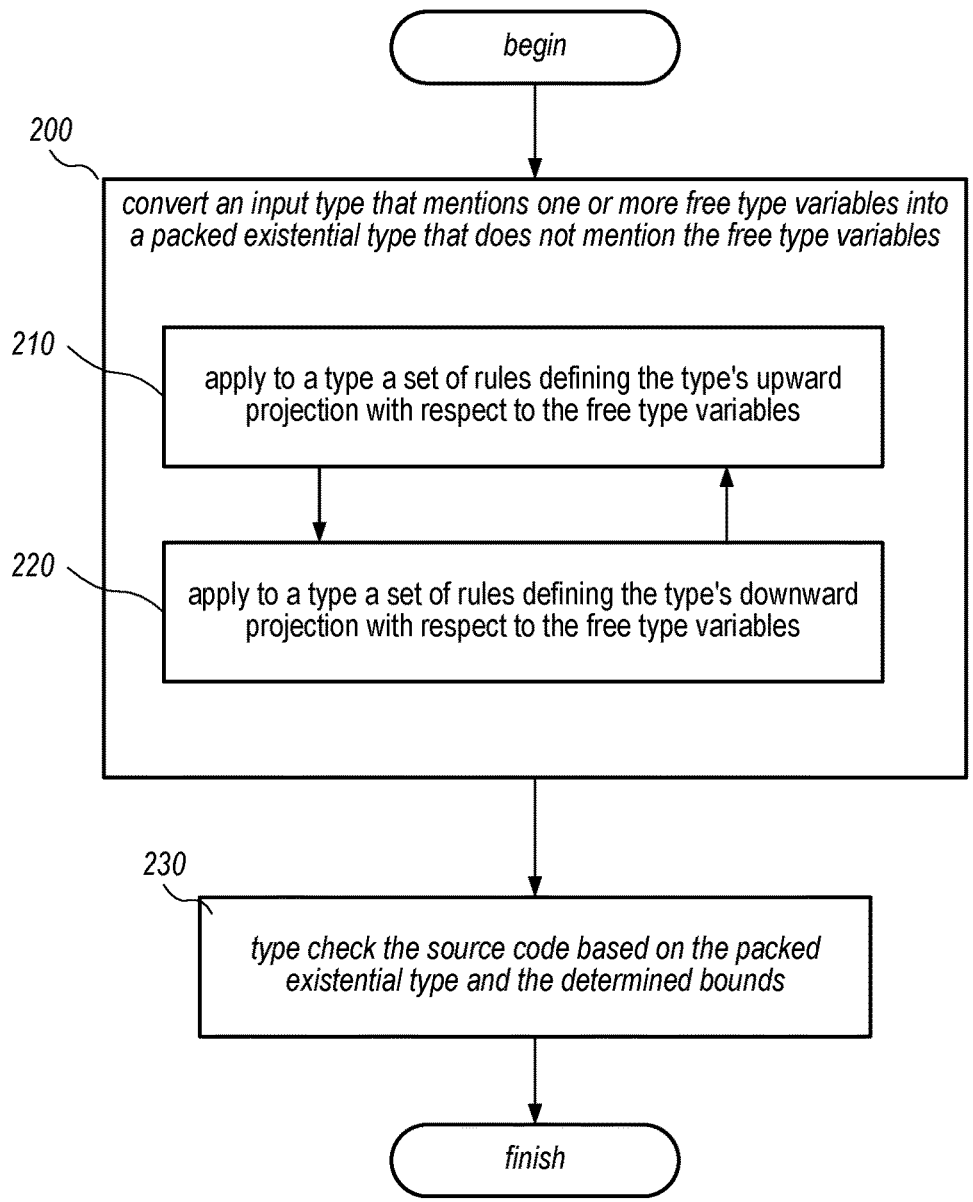
FIG. 2 is a flowchart illustrating one embodiment of a method for type checking using Existential Type Packing for Structurally-Restricted Existential Types, as described herein.

FIG. 2 is a flowchart illustrating one embodiment of a method for type checking using Existential Type Packing for Structurally-Restricted Existential Types, as described herein. According to some embodiments, a compiler, such as compiler 120 may begin to utilize Existential Type Packing for Structurally-Restricted Existential Types as part of type checking source code. In some embodiments, compiler 120 may be configured to perform the type checking itself, but in other embodiments, compiler 120 may be configured to utilize a separate type checking tool, such as type checker 110 to perform some or all of the type checking. In yet other embodiments, a separate, stand-alone, type checking tool may be used without a compiler to perform type checking, such as to type check source code 100.

While type checking source code 100, may identify (or encounter) an input type that mentions one or more free type variables. In response, compiler 120 may be configured to convert the input type into a packed existential type. For instance, compiler 120 may be configured to convert the input type (e.g., that mentions one or more free type variables) into a packed existential type that does not mention the free type variables, according to some embodiments, as shown in block 200. In some embodiments, the compiler may perform the conversion during type checking of a set of source code, such as source code 100. In other embodiments, input types (e.g., that mention free type variables) may be converted into packed existential types (that don't mention the free type variables) before type checking, but the results may be used for type checking.

Converting the input type to the packed existential type may involve a pack operation. The pack operation may, in some embodiments, be performed in terms of mappings applied to types, where the output type may be considered an approximation of the input type, where the output type does not mention one of the given set of type variables. One of the two mappings may be referred to as an upward projection 210. In some embodiments, an upward projection may identify a supertype of the input type that does not mention one of a given set of type variables. For example, the upward projection of the type "C<List<X>>" might be "C<? extends List<?>>" according to one Java-based example embodiment.

Similarly, the other mapping may be referred to as a downward projection 220. A downward projection may, in some embodiments, identify a subtype of the input type that does not mention one of a given set of type variables (if one exists). In some situations, a type may exist that does not have any appropriate subtype, and thus the downward projection of that type may be undefined.

Computing an upward projection 210 or a downward projection 220 may involve apply a set of rules, such as analysis rules 115, defining potential mappings applied to a type. The set of analysis rules may not only define potential mappings, but may also include criteria for determining which mappings should be applied.

After converting an input type into a packed existential type, the compiler may perform type checking on the source code based on the packed existential type and/or the determined bounds, as shown in block 230. As described above, type checking based on the packed existential type and/or the determined bounds may be more precise, more accurate, more complete, and/or provide better error reporting than might result from performing type checking not utilizing the packed existential type and/or the determined bounds, according to some embodiments.

Figure 3:
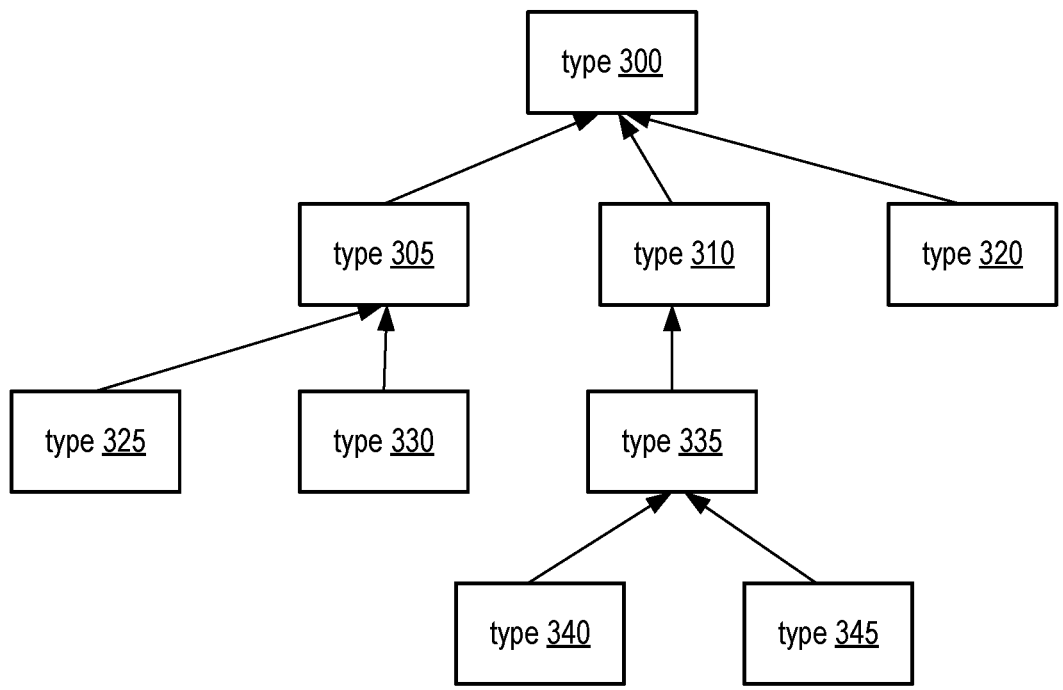
FIG. 3 is a logical block diagram illustrating various types arranged in a graph, according to one embodiment.

Projections (e.g., upward and downward projections) may be searches of a subtyping graph. FIG. 3 is a logical block diagram illustrating various types arranged in a graph, where each node represents a type, according to one embodiment. Nodes higher on the graph (e.g., closer to a root node) may represent supertypes of connected nodes lower on the tree. For example, as shown in FIG. 3, type 300 may represent a supertype of all the other nodes, while type 305 may represent a supertype of type 325 and type 330. Similarly, type 310 may represent a supertype of all the types represented by nodes lower on the tree (e.g., type 335, type 340, and type 345). Type 320 may not represent the supertype of any other type, according to the illustrated embodiment.

Nodes lower on the tree (e.g., closer to leaf nodes) may represent subtypes of connected nodes higher on the tree. For example, every type except type 300 may represent a subtype of type 300, while type 340 and type 345 may represent subtypes of type 335, type 310 and 300. Projections (upward projections and/or downward projections) may be considered hops that are as short as possible between one node and other (particular) nodes of the graph. For example, an upward projection from type 340 (and/or type 345) may result in type 335, while a downward projection from type 310 may result in type 335, according to one example embodiment.

As will be described in more detail below, in some embodiments a set of rules may be used when determining upward and downward projections. For instance, a compiler, such as compiler 120, may recognize a type that mentions type variables and perform (e.g., determine) upward and/or downward projections according to rule definitions (e.g., the rules) as described herein.

The set of rules may be considered a case analysis for all possible kinds of types. Thus, if the compiler is analyzing a particular kind of type that has a particular form, the compiler may utilize the rules to map it to another type. The rules may, in some embodiments, be considered derived from what can be logically known about the type being analyzed and its context with a goal of starting with a type, T, and some variables V1 ... Vn, removing the variables and using wildcards instead. Additionally, the rules may introduce some other wildcards to produce a valid result.

Type variables, like wildcards, may have upper bounds and so the compiler may project to the upper bound of the variable. The compiler may, in some embodiments, provide more precise type checking analysis, based on the packed existential type. For example, the compiler may perform type checking analysis by using an approximation of an existential type that is not expressible using Java's wildcards.

Existential Type Packing for Structurally-Restricted Existential Types as described herein may include defining and/or providing mappings from a type containing one or more free type variables to a "packed" existential type without the free type variables.

For instance, according to one example embodiment using the Java programming language, the "unpack" operation may consist of removing the implicit existential quantifier on a wildcard-parameterized type. However, the "pack" operation may not be as straightforward, according to some embodiments. For example, simply adding a quantifier to the type may produce an existential type that does not have an appropriate form (e.g., according to the specification for the programming language being used). Type checker 110 may, in some embodiments, need to perform "pack" operations on types with these types of forms, it may be necessary to define the operation in a way that produces valid types (e.g., for the programming language being used).

For example, consider the following Java-based example type declaration:

interface SetList<T> extends List<Set<T>>{ }

Figure 4:
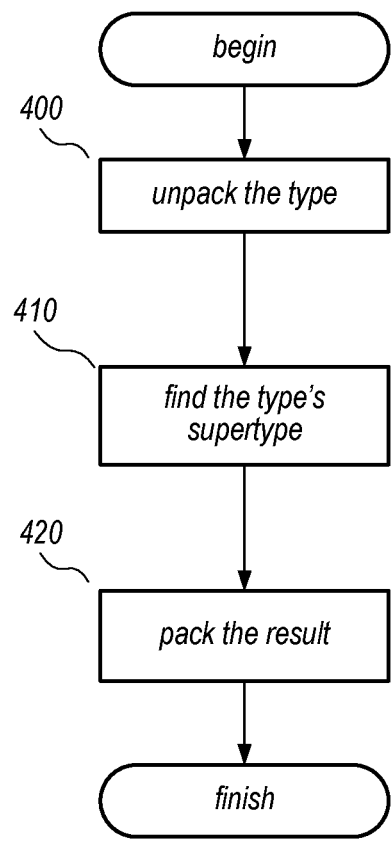
FIG. 4 is a flowchart illustrating one embodiment of a method for finding a superclass parameterization of an existential type, as described herein.

The above example may be a legal (e.g., syntactically correct) interface declaration in the Java programming language—any element that is taken out of an instance of the SetList interface will be a Set<T>, for whatever type T is. When parameterizing that interface with a wildcard (e.g., SetList<?>), the type may need to be viewed as a particular parameterization of List. FIG. 4 is a flowchart illustrating one embodiment of a method for finding a superclass parameterization of an existential type. As shown in block 400, compiler 120 and/or type checker 110 may be configured to unpack the type (e.g., SetList<X>). As noted above, unpacking a type may involve removing a quantifier from an existential type. As shown in block 410, compiler 120 and/or type checker 110 may be configured to find the type's supertype (e.g., List<Set<X>>). Then, as shown in block 420, this supertype is packed by finding an upward projection of the type with respect to all variables made free by the unpack operation of block 400 (e.g., List<? extends Set<?>>).

Because upward projection produces a tight approximation, the type checker still can deduce that an element taken out of the list is a Set<?>. In contrast, if the projection operation produced the weaker approximation List<?>, the type checker would not allow Set operations to be performed on elements taken out of the list.

Thus, in some embodiments, a pack operation may be utilized that is an approximation that produces the nearest supertype of the logical pack result that is expressible in the programming language.

Additionally, in some embodiments, some rules (e.g., analysis rules 115) may introduce new wildcards. A few choices on the supported expressiveness of wildcards may, in some embodiments, affect the details of such rules, as well as the precision of the result. For example, the analysis rules 115 may use wildcards that have both upper and lower bounds. However, some programming languages, such as the Java programming language, may force a choice between an upper or lower bound. Thus, in some embodiments, under such a restriction compiler 120 and/or type checker 110 may be configured to select or choose either the upper bound or the lower bound, while the other (e.g., non-chosen) bound may have to be discarded.

In some embodiments recursion in the application of analysis rules 115 (e.g., by applying the rules to the result of a previous application of the rules) may produce an infinite wildcard due to an infinite recursion. For instance, when analyzing a named type variable, that type variable may appear in its own bound. Thus, a recursive application of the rules may encounter the same input again, possibly causing an infinite recursive loop. Some programming languages may not support such infinite wildcard types. Thus, when applying analysis rules 115, compiler 120 and/or type checker 110 may be configured to break (e.g., stop) the recursion at some point, such as by using an unbounded wildcard.

Thus, analyzing a type by applying analysis rules 115 may involve one or more mechanisms to cope with, and/or prevent, the risk of an infinite recursive loop. For instance, compiler 120 and/or type checker 110 may keep track of the types being analyzed to determine if a recursive loop is occurring and stop the recursion at that point (e.g., possibly using an unbounded wildcard). For instance, the intermediate results of recursively applying the rules may be tracked. In one embodiment, a function used to implement the determination of a projection using the rules may have an extra parameter representing the list of inputs that have already be seen (during the current recursive cycle) which may be checked to determine whether an infinite loop has been encountered. If it is determined that an infinite loop has been encountered, the process may be halted, either with an error condition, by using an unbounded wildcard, or by any other suitable mechanism.

However, in other embodiments, a compiler may let the wildcard express the infinite loop in order to obtain an optimal answer to the analysis of the starting type. Thus, in some embodiments, a compiler may utilize a recursive type—i.e., a type that can appear inside of itself. For example, a recursive type may be encoded with a data structure that has a pointer back to the top (e.g., back to itself) or, in mathematical notation, a variable that is interchangeable with the entire type may be used so that when that variable is encountered it can be replaced (e.g., automatically) with the full type, according to some embodiments. Thus, in some embodiments, the resulting recursive type (or infinite type) may be used to represent a non-termination of the application of the set of rules.

Below is a listing of an example set of rules that may be utilized by a compiler (or other type checker) when determining upward and/or downward projections. In the example rules listing below, an asterisk (e.g., '*') is used to indicate a new wildcard.

Upward Projection Rules

Figure 5:
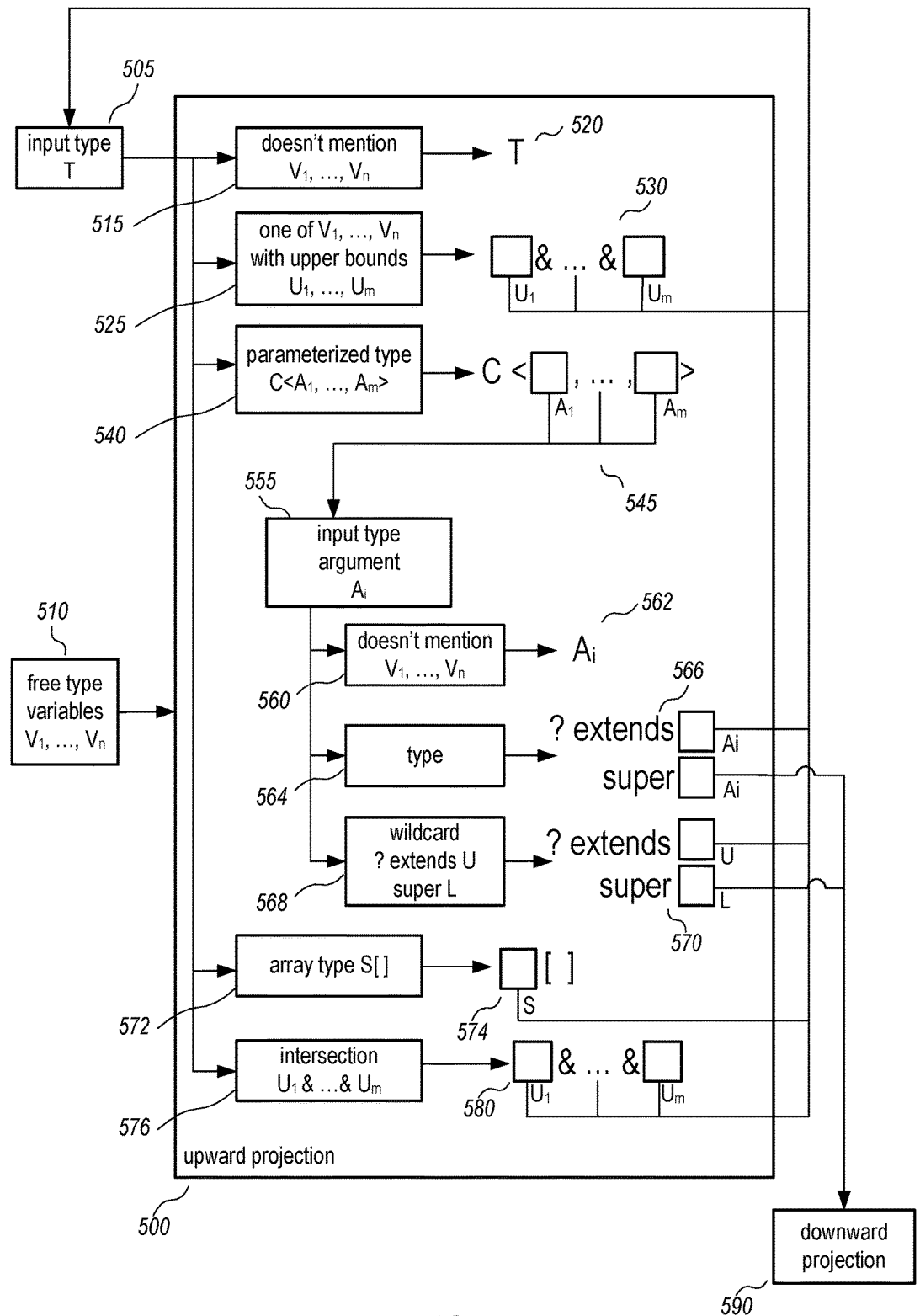
FIG. 5 is a logical diagram illustrating one embodiment of upward projection rules.

FIG. 5 is a logical diagram illustrating one embodiment of upward projection rules. The upward projection 500 of an input type T 505 with respect to free type variables V1, . . . , Vn 510 may be defined as follows:

If T does not mention any of V1, . . . , Vn, as illustrated by 515, then the result is T 520.

If T is one of the type variables, V1, . . . , Vn, as illustrated by 525, then the result is an intersection type 530; for each upper bound, U, of Vi, the intersection has an upper bound that is the upward projection of U with respect to V1, . . . , Vn.

If T is a parameterized class type or a parameterized interface type, C<A1, . . . , Am>, as illustrated by 525, then the result is C<A1', . . . , Am'> 545, where, for 1≤i≤m, Ai' is derived from Ai 555 as follows:

If Ai is a type that does not mention one of V1, . . . , Vn, then Ai'=Ai, as illustrated by 560 and 562.

If Ai is a type that mentions one of V1, . . . , Vn, as illustrated by 564, then Ai' is a wildcard* 566. The upper bound of Ai' is the upward projection of Ai with respect to V1, . . . , Vn. If the downward projection 590 of Ai with respect to V1, . . . , Vn is L, then L is the lower bound of Ai'; if the downward projection of Ai is undefined, then Ai' has no lower bound.

If Ai is a wildcard, as illustrated by 568, then Ai' is a wildcard* 570. For each upper bound, U, of Ai, Ai' has as an upper bound the upward projection of U with respect to V1, . . . , Vn. If Ai has a lower bound, L, and if the downward projection of L with respect to V1, . . . , Vn is L', then Ai' has lower bound L'; if Ai has no lower bound, or if the downward projection of L is undefined, then Ai' has no lower bound.

If T is an array type, S[ ], as illustrated by 572, then the result is an array type 574 whose component type is the upward projection of S with respect to V1, . . . , Vn.

If T is an intersection type, as illustrated by 576, then the result is an intersection type 580. For each upper bound, U, of T, the result has as an upper bound the upward projection of U with respect to V1, . . . , Vn.

Downward Projection Rules

Figure 6:
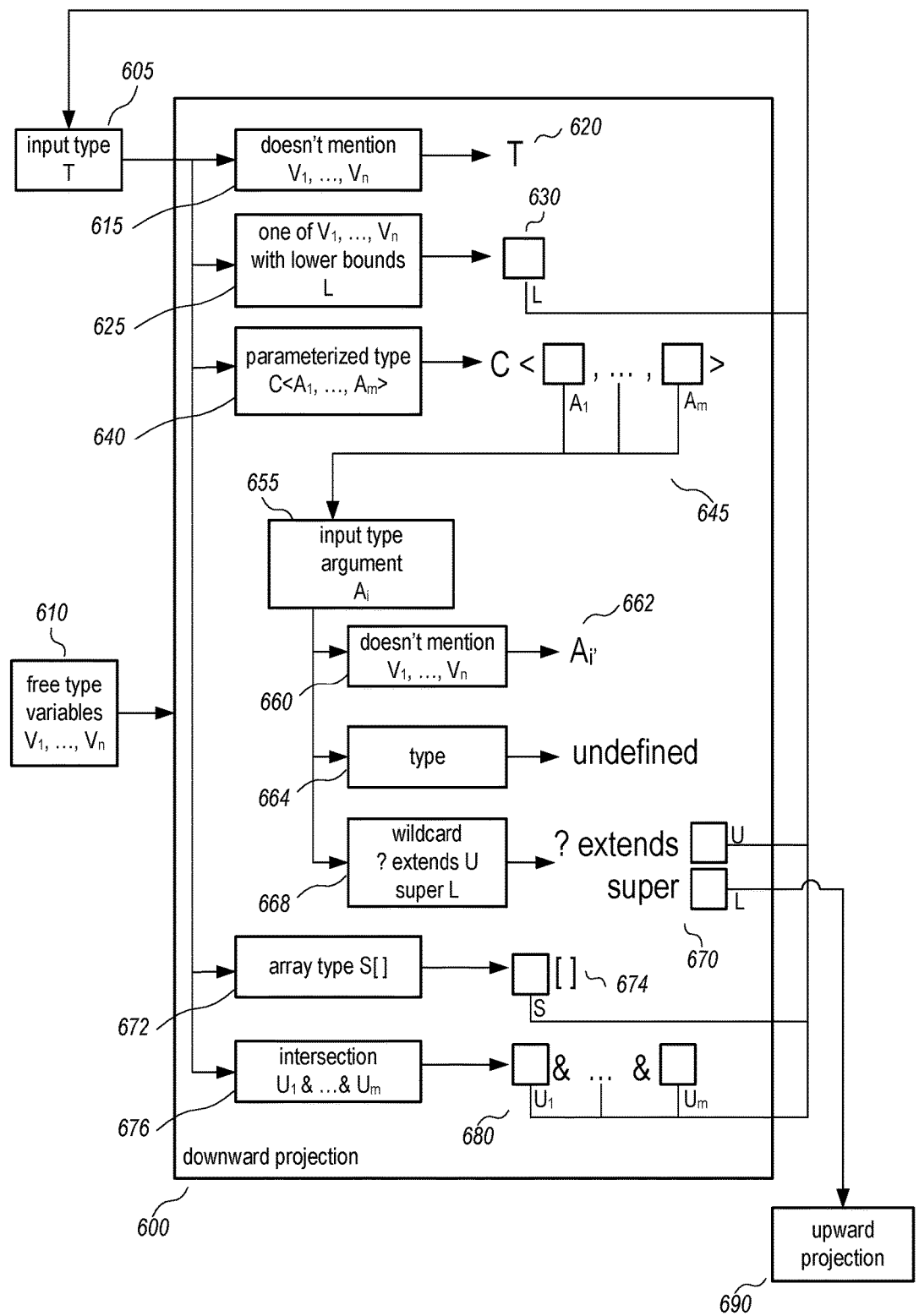
FIG. 6 is a logical diagram illustrating one embodiment of downward projection rules.

FIG. 6 is a logical diagram illustrating one embodiment of downward projection rules. The downward projection 600 of an input type T 605 with respect to a set of free type variables, V1, . . . , Vn 610, is a partial function, that may be defined as follows:

If T does not mention any of V1, . . . , Vn, as illustrated by 615, then the result is T 620.

If T is one of the type variables, Vi, then if Vi has a lower bound, L, and if the downward projection of L with respect to V1, . . . , Vn is L', as illustrated by 625, the result is L' 630; if Vi has no lower bound, or if the downward projection of L is undefined, then the result is undefined.

If T is a parameterized class type or a parameterized interface type, C<A1, . . . , Am>, as illustrated by 640, then the result is C<A1', . . . Am'> 645, if, for 1≤i≤m, a type argument Ai' can be derived from Ai 655 as follows; if not, the result is undefined:

If Ai is a type that does not mention one of V1, . . . , Vn, then Ai'=Ai, as illustrated by 660 and 662.

If Ai is a type that mentions one of V1, . . . , Vn, as illustrated by 664, then Ai' is undefined.

If Ai is a wildcard, as illustrated by 668, then Ai' is a wildcard* 670, if, for each bound of Ai, a bound of Ai' can be derived as follows. For each upper bound, U, of Ai, Ai' has as an upper bound the downward projection of U with respect to V1, ..., Vn. If Ai has a lower bound, L, then Ai' has as a lower bound the upward projection 690 of L with respect to V1, Vn.

If T is an array type, S[ ], as illustrated by 672, then if the downward projection of S with respect to V1, ..., Vn is S', the result is S'[ ] 674; if the downward projection of S is undefined, then the result is undefined.

If T is an intersection type, as illustrated by 676, then the result is an intersection type 680, if, for each bound of T, a bound of the result can be derived as follows. For each upper bound, U, of T, the result has as an upper bound the downward projection of U with respect to V1, ..., Vn.

The rules above represent only one possible example of rules that may be applied to determine an upward projection or a downward projection, as described herein.

An object oriented language may include a single, particular type (i.e., a base type) from which all other types must (e.g., by definition) extend. For instance, within the Java programming language, every type may have "Object" as a supertype. Thus, determining an upward projection may be guaranteed to succeed since eventually, every type is a subtype of the root type. On the other hand, there may not be a type that is a subtype of every other type. Thus, the downward projection may be considered a partial function—for some input there may not be an answer. For example, the input may be a type variable that has no lower bound. Consequently, some of the above rules may include clauses to work around that fact (i.e., the fact that there may not be any result of a downward projection).

Below are some examples of existential packing, as described above regarding FIG. 4, using the type projection functions (or rules). For instance, a typical use case may be to find a supertype of an existentially-quantified class or interface type.

EXAMPLE 1 interface A<T> extends List<T>{ }
A<?> is equivalent to [exists X. A-X>]
The supertype of A<?> that is a parameterization of List is [exists X. List<X>], which is equivalent to:
upward[X] (List<X>)
List<? extends upward[X] (X) super downward[X] (X)>
List<? extends upward[X] (Object)>
List<? extends Object>
(Note: 'downward[X] (X)' is undefined, so the wildcard has no lower bound.)

EXAMPLE 2

The supertype of A<? extends Number> that is a parameterization of List is [exists X, where {X<: Number}.List<X>], which is equivalent to: where X<: Number, upward[X] (List<X>)
List<? extends upward[X] (X) super downward[X] (X)>
List<? extends upward[X] (Number)>
List<? extends Number>

EXAMPLE 3

The supertype of A<? super Integer> that is a parameterization of List is [exists X, where {Integer<: X}.List<X>], which is equivalent to, where Integer<: X,
upward [X] (List<X>)
List<? extends upward[X] (X) super downward[X] (X)>
List<? extends upward[X] (Object) super downward[X] (Integer)>
List<? extends Object super Integer>
(Note: the "extends Object" may be considered redundant, so this may also be written List<? super Integer>)

EXAMPLE 4 interface B<T extends Number> extends List<T> { }
B<?> is equivalent to [exists X, where {X<: Number}. B<X>]
The supertype of B<?> that is a parameterization of List is [exists X, where {X<: Number}. List<X>]
which is equivalent to, where X<: Number, upward[X] (List<X>)
List<? extends upward[X] (X) super downward[X] (X)>
List<? extends upward[X] (Number)>
List<? extends Number>

EXAMPLE 5

The supertype of B<? extends Serializable> that is a parameterization of List is [exists X, where {X<: Number, X<: Serializable}. List<X>], which is equivalent to, where X<: Number and X<: Serializable,
upward [X] (List<X>)
List<? extends upward[X] (X) super downward[X] (X)>
List<? extends upward [X] (Number) & upward[X] (Serializable)>
List<? extends Number & Serializable>

EXAMPLE 6

The supertype of B<? super Integer> that is a parameterization of List is [exists X, where {X<: Number, Integer<: X }.List<X>]
which is equivalent to, where X<: Number and Integer<: X, upward [X] (List<X>)
List<? extends upward[X] (X) super downward[X] (X)>
List<? extends upward[X] (Number) super downward[X] (Integer)>
List<? extends Number super Integer>

EXAMPLE 7 interface C<T> extends List<Set<T>>{ }
C<?> is equivalent to [exists X. C<X>]
The supertype of C<?> that is a parameterization of List is [exists X. List<Set<X>>], which is approximated by
upward[X] (List<Set<X>>)
List<? extends upward[X] (Set<X>) super downward[X] (Set<X>)>
List<? extends Set<? extends upward[X] (X)>>
List<? extends Set<? extends upward[X] (Object)>>
List<? extends Set<? extends Object>>

EXAMPLE 8

The supertype of C<? extends Number> that is a parameterization of List is:
[exists X, where {X<: Number}.List<Set<X>>]
which is approximated by, where X<: Number,
upward[X] (List<Set<X>>)
List<? extends upward[X] (Set<X>) super downward[X] (Set<X>)>

List<? extends Set<? extends upward[X] (X)>>
List<? extends Set<? extends upward[X] (Number)>>
List<? extends Set<? extends Number>>

EXAMPLE 9

The supertype of C<? super Integer> that is a parameterization of List is [exists X, where {Integer<: X}.List<X>]
which is approximated by, where Integer<: X,
upward[X] (List<Set<X>>)
List<? extends upward[X] (Set<X>) super downward[X] (Set<X>)>
List<? extends Set<? extends upward[X] (X)>>
List<? extends Set<? extends upward[X] (Object)>>
List<? extends Set<? extends Object>>
(Note: The lower bound, 'Integer', does not show up in the result, because of the way downward projection of parameterized types works)

EXAMPLE 10 interface D<T> extends List<Set<? super T>>{ }
D<?> is equivalent to [exists x D<X>]
The supertype of D<?> that is a parameterization of List is [exists X. List<Set<? super X>>]
which is approximated by
upward [X] (List<Set<? super X>>)
List<? extends upward[X] (Set<? super X>) super downward[X] (Set<? super X>)>
List<? extends Set<? super downward[X] (X)> super Set<? super upward[X] (X)>>
List<? extends Set<?> super Set<? super upward[X] (Object)>>
List<? extends Set<?> super Set<? super Object>>

EXAMPLE 11

The supertype of D<? extends Number> that is a parameterization of List is: [exists X, where {X<: Number}. List<Set<? super X>>]
which is approximated by, where X<: Number,
upward [X] (List<Set<? super X>>)
List<? extends upward[X] (Set<? super X>) super downward[X] (Set<? super X>)>
List<? extends Set<? super downward[X] (X)> super Set<? super upward[X] (X)>>
List<? extends Set<?> super Set<? super upward[X] (Number)>>
List<? extends Set<?> super Set<? super Number>>

EXAMPLE 12

The supertype of D<? super Integer> that is a parameterization of List is [exists X, where {Integer<: X}. List<Set<? super X>>]
which is approximated by, where Integer<: X,
upward [X] (List<Set<? super X>>)
List<? extends upward[X] (Set<? super X>) super downward[X] (Set<? super X>)>
List<? extends Set<? super downward[X] (X)> super Set<? super upward[X] (X)>>
List<? extends Set<? super downward[X] (Integer)> super Set<? super upward[X] (Object)>>
List<? extends Set<? super Integer> super Set<? super Object>>

EXAMPLE 13 interface E<T extends Set<T>> extends List<T> { }
E<?> is equivalent to [exists X, where {X<: Set<X>}. C<X>]
The supertype of E<?> that is a parameterization of List is [exists X, where {X<: Set<X>}. List<X>]
which is approximated by, where X<: Set<X>,
upward [X] (List<X>)
List<? extends upward[X] (X) super downward[X] (X)>
List<? extends upward[X] (Set<X>)>
List<? extends Set<? extends upward[X] (X) super downward[X] (X)>>
List<? extends Set<? extends upward[X] (Set<X>)>>
List<? extends Set<? extends Set<? extends upward[X] (X) super downward[X] (X)>>>
List<? extends Set<? extends Set<? extends upward[X] (Set<X>)>>>
. . .
(Note: This is a non-terminating recursion; the algorithm could detect the loop and produce a recursive or infinite type that may represent the non-termination of the application of the rules. Or, with less precision, give up at some point and just produce Set<?>.)

EXAMPLE 14

The supertype of E<? extends Serializable> that is a parameterization of List is [exists X, where {X<: Set<X>, X<: Serializable}. List<X>]
which is approximated by, where X<: Set<X> and X<: Serializable,
upward [X] (List<X>)
List<? extends upward[X] (X) super downward[X] (X)>
List<? extends upward[X] (Set<X>) & Serializable>
List<? extends Set<? extends upward[X] (X) super downward[X] (X)> & Serializable>
List<? extends Set<? extends upward[X] (Set<X>) & Serializable> & Serializable>
List<? extends Set<? extends Set<? extends upward[X] (X) super downward[X] (X)> & Serializable> & Serializable>
List<? extends Set<? extends Set<? extends upward[X] (Set<X>)> & Serializable> & Serializable>

EXAMPLE 15

The supertype of E<? super MySet> that is a parameterization of List is [exists X, where {X<: Set<X>, MySet<: X}. List<X>]
which is approximated by, where X<: Set<X> and MySet<:X,
upward [X] (List<X>)
List<? extends upward[X] (X) super downward[X] (X)>
List<? extends upward[X] (Set<X>) super MySet>
List<? extends Set<? extends upward[X] (X) super downward[X] (X)> super MySet>
List<? extends Set<? extends upward[X] (Set<X>) super MySet> super MySet>
List<? extends Set<? extends Set<? extends upward[X] (X) super downward[X] (X)> super MySet>super MySet>
List<? extends Set<? extends Set<? extends upward[X] (Set<X>) super MySet> super MySet> super MySet>

Thus, the use of an existential pack operation, as described herein, may result in logically sound compiler behavior, while potentially avoiding loss of typing information that might occur if using a less precise approximation. For instance, a compiler, such as compiler 120, implementing the mappings and projections (e.g., upward and downward projections) described herein may result in users experiencing more intuitive type checking and/or fewer compiler errors, according to some embodiments.

For example, the pack operation may compute a bound of a wildcard that can be used for type checking. When type checking, that bound may be desired in order to know (e.g., determine) as much as possible about the type of a particular expression. When performing an upward projection, it may be desirable to find a type that is a supertype of the original but that still provides additional information about the variable or expression. However, if the upward projection is relaxed too far (e.g., using a supertype that is too far above the original type), information may be lost, possibly causing additional (and unnecessary) errors during type checking.

In some embodiments, the packing of existential types may be performed in a consistent (and, ideally, optimal) manner in order to provide correct logic within a type system. For example, use of existential types as described herein may result in a compiler producing better error reports, such as fewer false error reports, as well as preventing improper compiler execution (e.g., crashing, etc.). The method for existential type packing may also allow type checking the source code more precisely, based at least in part on the packed existential type, than could be performed without converting the input type.

By utilizing the methods and techniques described herein, a compiler may provide more accurate type checking, which is often expressed as soundness or completeness. A compiler may thus utilize sound logic (e.g., drawing correct conclusions) while being as complete as possible (e.g., preserving as much information as possible). In some embodiments, a compiler may implement the techniques described herein without requiring any syntactical changes to the way in which programmers write source code.

Figure 7:
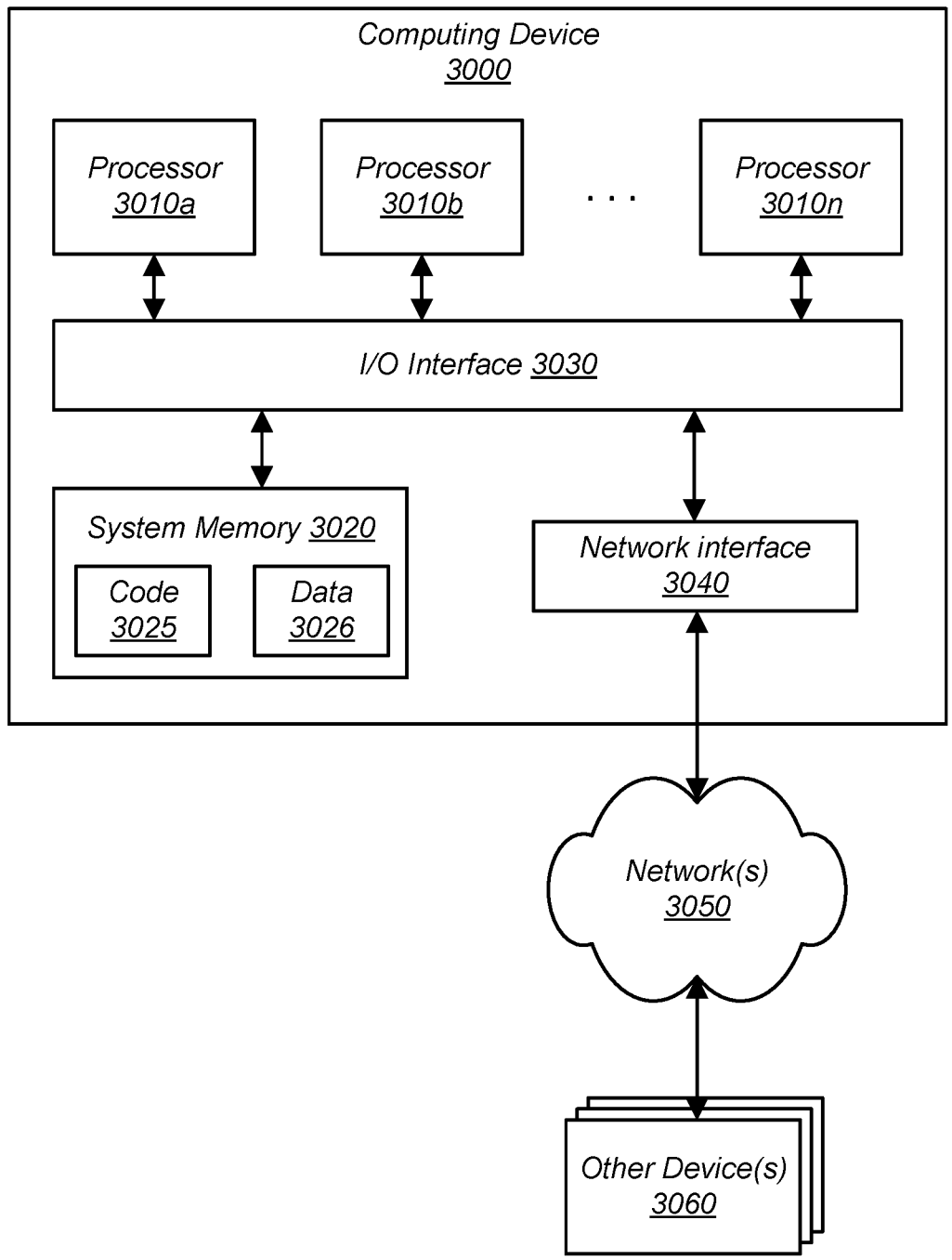
FIG. 7 is a block diagram illustrating one embodiment of a computer system suitable for implementing methods and features described herein.

In at least some embodiments, a computer system that implements a portion of, or all of, one or more of the technologies described herein may include a general-purpose computer system that includes or is configured to access one or more computer-readable media. FIG. 7 illustrates such a general-purpose computing device 3000 suitable for implementing the methods, features and enhancements described herein. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026. For example, memory 3020 and well as code 3025 and data 3026 may store, in one embodiment, program instructions and data for implementing type checker 110 and/or compiler 120, described above.

In various embodiments, type checker 110 and/or compiler 120 (and/or any individual sub-modules thereof) may each be implemented in any of various programming languages and/or according to various methods. For example, in one embodiment, type checker 110 and/or compiler 120 may be written in any of the C, C++, assembly, Java or other general purpose programing languages, while in another embodiment, one or more of them may be written using a different, more specialized, programming language. Moreover, in some embodiments, type checker 110 and/or compiler 120 (and/or various sub-modules thereof) may not be implemented using the same programming language.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1, for example. In various embodiments, network interface 3040 may support communication via any suitable wired or wireless general data networks, such as types of Ethernet network, for example.

In some embodiments, system memory 3020 may be one embodiment of a computer-readable (e.g., computer-accessible) medium configured to store program instructions and data as described herein (such as with respect to FIGS. 1-6) for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory.

Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various ones of the methods, the order of the steps may be changed and various elements may be added, reordered, combined, omitted, modified, etc. Various steps may be performed automatically (e.g., without being directly prompted by user input) and/or programmatically (e.g., according to program instructions).

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. For example, actions, processes, methods, tasks or functions described herein as being performed by compiler 120 may, in some embodiments, be performed by type checker 110 and vice versa. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete components in the exemplary configurations may be implemented as a combined structure or component.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
one or more processors; and
a memory comprising program instructions, wherein the program instructions are executed by the one or more processors to perform:
converting, by a compiler during type checking of source code, an input type that mentions one or more free type variables, wherein one or more types of the one or more free type variables is unknown by the compiler, into a packed existential type that does not mention the one or more free type variables;
wherein said converting, by the compiler, the input type that mentions the one or more free type variables into the packed existential type comprises determining a plurality of bounds for an existential type variable of the packed existential type, wherein the determined plurality of bounds for the existential type variable of the packed existential type comprise:
a determined upper bound for the existential type variable; and
a determined lower bound for the existential type variable; and
type checking the source code based at least in part on the packed existential type and the plurality of determined bounds.

2. The system of claim 1, wherein said converting comprises applying, to the input type, at least one rule from a set of rules defining potential mappings and corresponding criteria for determining which potential mapping should be applied.

3. The system of claim 2, wherein said determining is based, at least in part, on said applying the at least one rule.

4. The system of claim 2, wherein said converting further comprises applying the set of rules recursively to intermediate results of applying the rules to the input type.

5. The system of claim 4, wherein said applying recursively comprises tracking the intermediate results, to which the set of rules are applied recursively, to prevent infinite recursion.

6. The system of claim 4, wherein the packed existential type is a recursive type representing a non-termination of said applying the at least one rule.

7. The system of claim 1, wherein the packed existential type is a supertype of the input type.

8. The system of claim 1, wherein said converting further comprises determining a supertype of the input type, wherein the supertype is a nearest supertype of the input type that does not mention the one or more free type variables.

9. The system of claim 1, wherein said converting further comprises determining a subtype of the input type, wherein the subtype is a nearest subtype of the input type that does not mention the one or more free type variables.

10. The system of claim 1, wherein the source code is written in a particular programming language wherein the packed existential type approximates a logical existential type.

11. A non-transitory computer-readable storage medium storing program instructions that when executed on a computing device cause the computing device to perform:
converting, by a compiler during type checking of source code, an input type that mentions one or more free type variables, wherein one or more types of the one or more free type variables is unknown by the compiler, into a packed existential type that does not mention the one or more free type variables;

wherein said converting, by the compiler, the input type that mentions the one or more free type variables into the packed existential type comprises determining a plurality of bounds for an existential type variable of the packed existential type, wherein determined the plurality of bounds for the existential type variable of the packed existential type comprise:
- a determined upper bound for the existential type variable; and
- a determined lower bound for the existential type variable; and type checking the source code based at least in part on the packed existential type and the plurality of determined bounds.

12. The non-transitory computer-readable storage medium of claim 11, wherein said converting comprises applying, to the input type, at least one rule from a set of rules defining potential mappings and corresponding criteria for determining which potential mapping should be applied, wherein said determining is based, at least in part, on said applying the at least one rule.

13. The non-transitory computer-readable storage medium of claim 12, wherein said converting further comprises applying the set of rules recursively, to intermediate results of applying the rules to the input type.

14. The non-transitory computer-readable storage medium of claim 11, wherein said converting further comprises determining a supertype of the input type, wherein the supertype is a nearest supertype of the input type that does not mention the one or more free type variables.

15. The non-transitory computer-readable storage medium of claim 11, wherein said converting further comprises determining a subtype of the input type, wherein the subtype is a nearest subtype of the input type that does not mention the one or more free type variables.

16. A method, comprising:
performing, by one or more computing devices:
converting, by a compiler during type checking of source code, an input type that mentions one or more free type variables, wherein one or more types of the one or more free type variables is unknown by the compiler, into a packed existential type that does not mention the one or more free type variables;

wherein said converting, by the compiler, the input type that mentions the one or more free type variables into the packed existential type comprises determining a plurality of bounds for an existential type variable of the packed existential type, wherein the determined plurality of bounds for the existential type variable of the packed existential type comprise:
- a determined upper bound for the existential type variable; and
- a determined lower bound for the existential type variable; and type checking the source code based at least in part on the packed existential type and the plurality of determined bounds.

17. The method of claim 16, wherein said converting comprises applying, to the input type, at least one rule from a set of rules defining potential mappings and corresponding criteria for determining which potential mapping should be applied, wherein said determining is based, at least in part, on said applying the at least one rule.

18. The method of claim 17, wherein said converting further comprises applying the set of rules recursively, to intermediate results of applying the rules to the input type.

19. The method of claim 16, wherein said converting further comprises determining a supertype of the input type, wherein the supertype is a nearest supertype of the input type that does not mention the one or more free type variables.

20. The method of claim 16, wherein said converting further comprises determining a subtype of the input type, wherein the subtype is a nearest subtype of the input type that does not mention the one or more free type variables.

* * * * *

UNITED STATES PATENT AND TRADEMARK OFFICE
CERTIFICATE OF CORRECTION

PATENT NO. : 10,521,204 B2  
APPLICATION NO. : 15/162550  
DATED : December 31, 2019  
INVENTOR(S) : Smith Page 1 of 1

It is certified that error appears in the above-identified patent and that said Letters Patent is hereby corrected as shown below:

In the Specification

In Column 2, Line 10, delete "x," and insert -- X, --, therefor.

In Column 10, Line 35, delete "Tis" and insert -- T is --, therefor.

In Column 13, Line 25, delete "x D<X>]" and insert -- X.D<X>] --, therefor.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*